(12) United States Patent
Stiffler (10) Patent No.: US 7,420,476 B2
(45) Date of Patent: Sep. 2, 2008

(54) PROGRAMMABLE COCKPIT UPGRADE SYSTEM

(75) Inventor: William T. Stiffler, Greenwood, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/031,189

(22) Filed: Jan. 7, 2005

(65) Prior Publication Data

US 2006/0164261 A1 Jul. 27, 2006

(51) Int. Cl.
*G08B 21/00* (2006.01)

(52) U.S. Cl. ............. 340/945; 340/946; 709/253; 701/4

(58) Field of Classification Search ............ 340/945, 340/964, 971–973, 425.5, 438, 411, 441, 340/425; 701/3–18; 709/201, 203, 245, 709/253; 307/9.1, 10.1; 244/118.5; 700/17–18, 700/83; 180/90
See application file for complete search history.

(56) References Cited

U.S. PATENT DOCUMENTS

| | | | |
|---|---|---|---|
| 5,390,356 A * | 2/1995 | Houlberg | 703/23 |
| 5,592,198 A | 1/1997 | Fagard et al. | |
| 5,896,098 A * | 4/1999 | Goode et al. | 340/974 |
| 6,112,141 A * | 8/2000 | Briffe et al. | 701/14 |
| 6,803,860 B1 * | 10/2004 | Langner et al. | 340/971 |

OTHER PUBLICATIONS

George, Fred, Flat-Panel Displays Are Here, Business and Commercial Aviation, Jul. 1994, pp. 48-51.
Condor Engineering ARINC 429 Tutorial. Retrieved on Internet: <http://www.429-arinc.com/arinc-429-tutorial.html>. Retrieved on Nov. 4, 2004. pp. 1-5.
CDNU Interactive Training Solutions. Products of the DCS Corporation ITS Model. Boost CDNU Acceptance and Proficiency Quickly and Cost-Effectively, 2005.
Air Force Research Laboratory/AFRL. Science and Technology for Tomorrow's Air and Space Force. Success Story. Situation Awareness Data Link Radio Provides Warfighters with a Secure Communications System, 2005.

* cited by examiner

*Primary Examiner*—Davetta W. Goins
*Assistant Examiner*—Hongmin Fan
(74) *Attorney, Agent, or Firm*—Renner, Otto, Boisselle & Sklar, LLP (57) ABSTRACT

Disclosed is a programmable computing and display device for upgrading a cockpit instrument panel of an aircraft. The programmable computing and display device includes a plurality of processing units; a network backbone that establishes a network among the processing units for the exchange of network data traffic; at least one display to display video graphics to a cockpit crew member; and a modular assembly that retains the processing units, the network backbone and the display.

24 Claims, 5 Drawing Sheets

PROGRAMMABLE COCKPIT UPGRADE SYSTEM

TECHNICAL FIELD

The present invention relates to human-machine interface device that can be installed in a cockpit of a legacy aircraft with minimal reconfiguration of the aircraft and to enhance the functionality of the instrument panel.

BACKGROUND

Aging planes and helicopters are often referred to as "legacy aircraft." For purpose of the description herein, legacy aircraft include airplanes and helicopters that are deployed in the field with existing equipment and this equipment generally has a fixed architecture and fixed functionality. For example, in many field deployed aircraft, the cockpits contain conventional gauges and instruments to display information to the pilot and/or other crew members (e.g., flight and engine gauges and instruments, including, for example, altimeters, airspeed indicators, turn and bank indicators, compasses, vertical speed indicators and gyros, attitude instruments, fuel gauges, engine performance gauges and the like). Although each of these devices is adapted to present valuable information to the flight crew, each has a single purpose and do not have interactive functionality. Some aircraft include a television monitor for viewing images derived from a video signal generated by a camera mounted to the aircraft or a store that is releasable from the aircraft.

It has been found that legacy military aircraft do not have cockpit devices that provide the pilot and/or cockpit crew with suitable graphical displays, data acquisition and processing functionality, and a human-machine interface (HMI) to maximize the mission and/or combat fighting capability of the cockpit crew. One notable feature that is missing from the aircraft is the display of moving maps that can show enemy, friendly and neutral party positions and/or flight plan waypoints. Also missing is integrated networked communication with a command and control facility to update mission information seamlessly with avionics information from the aircraft itself.

Unfortunately, retrofitting aging military aircraft to include enhanced display and operational functionality has presented numerous challenges. These challenges are pronounced when upgrading the cockpit to include enhanced user interactive assemblies. In particular, space in the cockpit is limited by the presence of existing equipment. In addition, the existing wiring leading to the cockpit instrumentation panel has a fixed arrangement and limited data availability at the cockpit instrument panel since computer assisted processing of data and signals, if carried out, is not performed by devices in the cockpit instrument panel. Rather, processors are located in other locations of the aircraft and wires carrying only instrument driver signals are run to the cockpit instrument panels.

In view of the foregoing, the conventional approach to upgrading cockpit instrumentation is to replace a selected instrument panel component(s), the wiring running to the component(s) and the associated signal processing device(s) that is located outside of the instrument panel. As can be appreciated, such an endeavor involves significant overhaul of the aircraft. The aircraft must be taken out of service for an extended period of time. Also, considerable retraining of cockpit personnel may be needed to use the new cockpit instruments.

Accordingly, there exists a need in the art for an improved interactive device that can be efficiently integrated into legacy cockpit instrument panels.

SUMMARY OF THE INVENTION

One aspect of the invention relates to a programmable computing and display device for upgrading a cockpit instrument panel of an aircraft including a plurality of processing units; a network backbone that establishes a network among the processing units for the exchange of network data traffic; a display to display video graphics to a cockpit crew member; and a modular assembly that retains the processing units, the network backbone and the display.

Another aspect of the invention relates to a programmable computing and display device including a general purpose processor for executing logical instructions in the form of computer software; a touch screen display that forms an interactive human-machine interface by displaying video graphics and accepting user input with a pressure sensitive surface; and a housing that retains the processor and the touch screen, the housing physically configured to replace a gauge assembly (for example, an analog sensor display). In one embodiment, the device can be assembled together as a full or partial field-installable replacement to a cockpit instrument panel.

Yet another aspect of the invention relates to an aircraft including a plurality of computing devices networked together with one of a 100baseT Ethernet network backbone or an IEEE 1394 Firewire network backbone. In one embodiment, the device can be assembled together as a full or partial field-installable replacement to a cockpit instrument panel.

BRIEF DESCRIPTION OF DRAWINGS

These and further features of the present invention will be apparent with reference to the following description and drawings, wherein.

DESCRIPTION

In the description that follows, like components have been given the same reference numerals, regardless of whether they are shown in different embodiments of the present invention. To illustrate the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Described below is a programmable cockpit upgrade system that is configured as a "drop-in" replacement unit for a device or devices from an existing cockpit instrument panel. The system replaces, for example, an analog sensor display and/or legacy analog gauges. The system is a form-fit-function replacement that interfaces to existing aircraft wiring and out-of-cockpit instrument panel systems (e.g., computing devices and sensors). The system is shaped to retain an existing cockpit instrument panel mold line to physically and visually fit into the instrument panel layout. The system enhances aircraft functionality by performing functions not previously available in legacy aircraft cockpits, such as a moving map with integrated situational awareness, an upfront controller and/or a digital stores management function. The system adds these mission processing upgrades the aircraft platform as well as performs any existing functions of the instrument panel devices that were replaced and performs primary flight and engine instrumentation functions. As will be appreciated, the mission processing upgrades are added over existing avionics architecture of the aircraft in a non-intrusive manner (e.g., with minimal or no changes to existing aircraft wiring and/or out-of-cockpit instrument panel systems.

Figure 1:
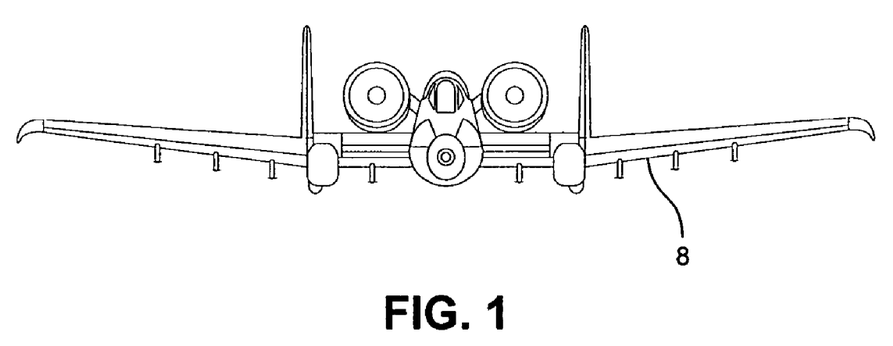
FIG. 1 is an illustration of an example legacy aircraft that includes a programmable cockpit upgrade system according to the present invention for a legacy cockpit environment of the aircraft.

Referring to FIG. 1, shown is a legacy aircraft 8. As indicated, legacy aircraft include airplanes and helicopters that are deployed in the field with existing equipment and this equipment generally has a fixed architecture and fixed functionality. The illustrated legacy aircraft 8 is military style airplane that can be upgraded to include the programmable cockpit upgrade system described herein. As will be appreciated, the illustration and description of a military airplane is a not intended to limit the application of the programmable cockpit upgrade system. That is, the illustrated military airplane is just an example environment in which the programmable cockpit upgrade system can be deployed. The programmable cockpit upgrade system can be deployed with similar results in military helicopters, commercial airplanes and commercial helicopters. By way of example, the illustrated embodiment of the programmable cockpit upgrade system is adapted for physical integration into the cockpit of an A-10 aircraft (the "Warthog" or "Thunderbolt II" airplane usually used for close air support of ground forces).

Figure 2A:
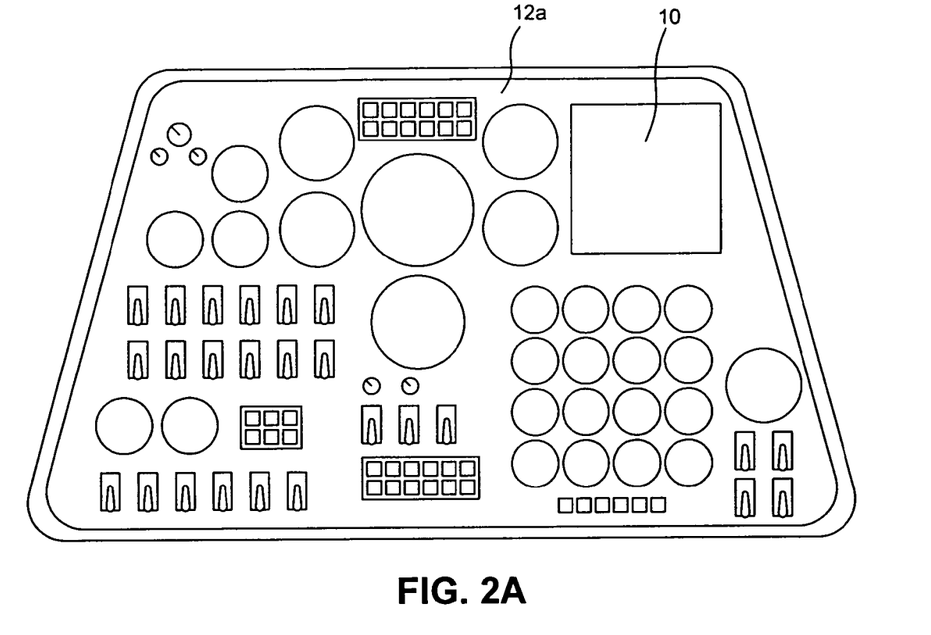
FIG. 2A is a front view of a legacy cockpit instrument panel of the aircraft that includes a replaceable component or components.

With additional reference to FIG. 2A, the system can replace a legacy analog sensor display 10 and/or analog gauges (e.g., flight and/or engine gauges) located in a legacy cockpit instrument panel 12a. The system is configured such that the replacement requires minimal or no modifications to the aircraft 8. Of course, the illustrated embodiment can have application for other types of aircraft and/or can be modified (e.g., "repackaged" to have an alternative physical arrangement and/or system architecture) for use in other types of aircraft. For purposes of an example, the cockpit instrument panel 12a shown in FIG. 2A can represent a portion of the cockpit "before" being upgraded with the system described herein.

Figure 2B:
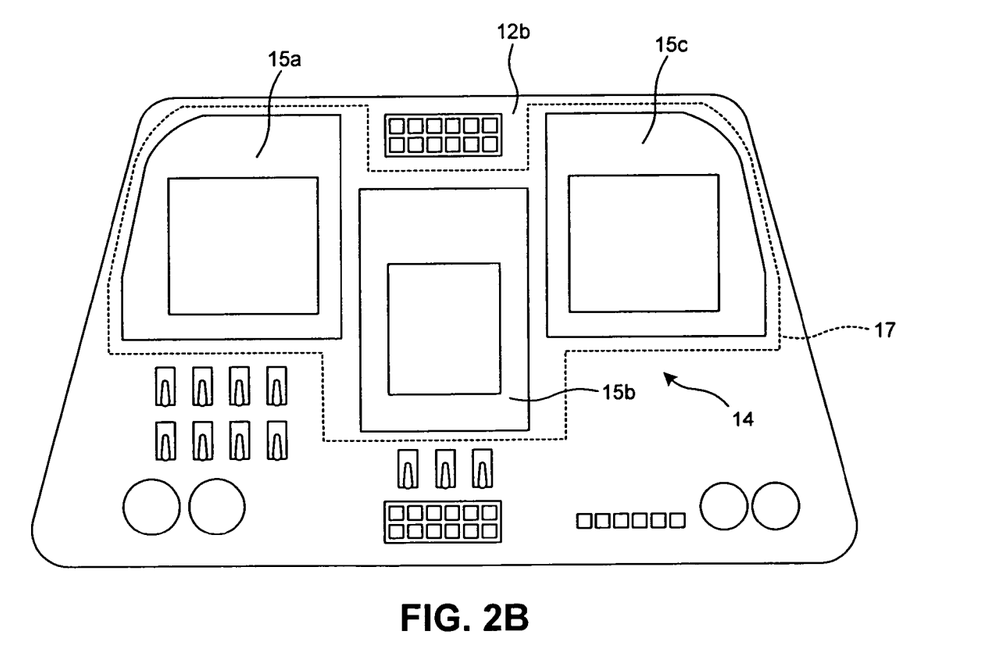
FIG. 2B is a front view of a legacy cockpit instrument panel of the aircraft that includes the programmable cockpit upgrade system.

With additional reference to FIG. 2B, schematically shown is a front view of a cockpit instrument panel 12b for the legacy aircraft 8 "after" being upgraded with a programmable cockpit upgrade system 14 (sometimes referred to herein as an aircraft computing and display device, as an interactive device, or as a multi-function display). The cockpit instrument panel 12b can continue to include some conventional instruments, such as gauges, toggles switches, push button switches, indicator lights, dials, knobs and so forth. The programmable cockpit upgrade system 14 is a "form-fit-function" replacement to a previously installed cockpit instrument panel device, assembly or set of devices. In one particular embodiment, the replaced item includes at least an analog sensor display 10 used to show video images.

As a form-fit-function replacement device, the old instrument panel item(s) can be removed from the legacy aircraft 8 and the programmable cockpit upgrade system 14 can be installed in the legacy aircraft 8 with minimal changes to the remaining architecture of the aircraft, including the wiring configuration leading to the removed device. Also, the programmable cockpit upgrade system 14 is implemented to carry out or otherwise include some, if not all, of the functions of the replaced item(s).

In most instances, removal of the old item(s) from the cockpit instrument panel includes disconnecting (e.g., unscrewing) fasters that attach the old device to the instrument panel 12, pulling the old item(s) out of the instrument panel and disconnecting wires and/or a wiring harness(es) that establishes connection of the old item(s) to other devices and assemblies within the aircraft 8.

Upon removal of the old item(s) from the instrument panel 12, the programmable cockpit upgrade system 14 can be put in the place of the old item(s). In one embodiment, the programmable cockpit upgrade system 14 can be installed by connecting the wires and/or wiring harness(es) previously connected to the old item(s), inserting the programmable cockpit upgrade system 14 into the instrument panel 12 in the location previously occupied by the old item(s) and installing fasteners to secure the programmable cockpit upgrade system 14 to the instrument panel 12. In other words, the programmable cockpit upgrade system 14 can be made to fit into and operatively interface with the "hole" or "holes" left by the old item(s). As used herein, the term "hole" refers to both the physical space previously occupied by the old item(s) in the instrument panel and the legacy wiring previously connected to the old item(s), inclusive of the signals transmitted or present on those wires. One will appreciate, that the terms wiring and wires are used broadly and can include electrical wires and cables, optical fibers, wireless communications links and so forth. The programmable cockpit upgrade system 14 can be configured to replace a portion of an existing instrument panel or the entire instrument panel 12.

As will be appreciated, each legacy aircraft has a number of potential cockpit instrument panel devices that can be replaced. Therefore, the designer of the programmable cockpit upgrade system is challenged to determine which of the old devices to replace. Also, since it may be advantageous to construct one programmable cockpit upgrade system 14 that can be used in multiple aircraft, the designer is further challenged to assess the potential overlap of old devices among multiple legacy aircraft. As one may expect, in aggregate, the designer could be expected to survey hundreds or thousands of legacy cockpit panel devices to determine which one or ones could be replaced by the programmable cockpit upgrade system 14. In addition, the programmable cockpit upgrade system 14 is intended to carry out certain functionality and provide an adequate user interface, such as a touch screen that is sensitive to pressure applied with a user's finger and/or a stylus. Accordingly, the size of the device to be replaced should be sufficient to accommodate these characteristics of the programmable cockpit upgrade system 14. Furthermore, in the embodiment where no wiring or other architecture changes are made to the aircraft 8 other than to replace a legacy instrument panel device(s), the designer must evaluate the available signals (e.g., avionics information, weaponry information, electronic warfare information, etc.) available through the wiring for each potential replaceable device and/or from other sources within the aircraft 8.

Figure 3:
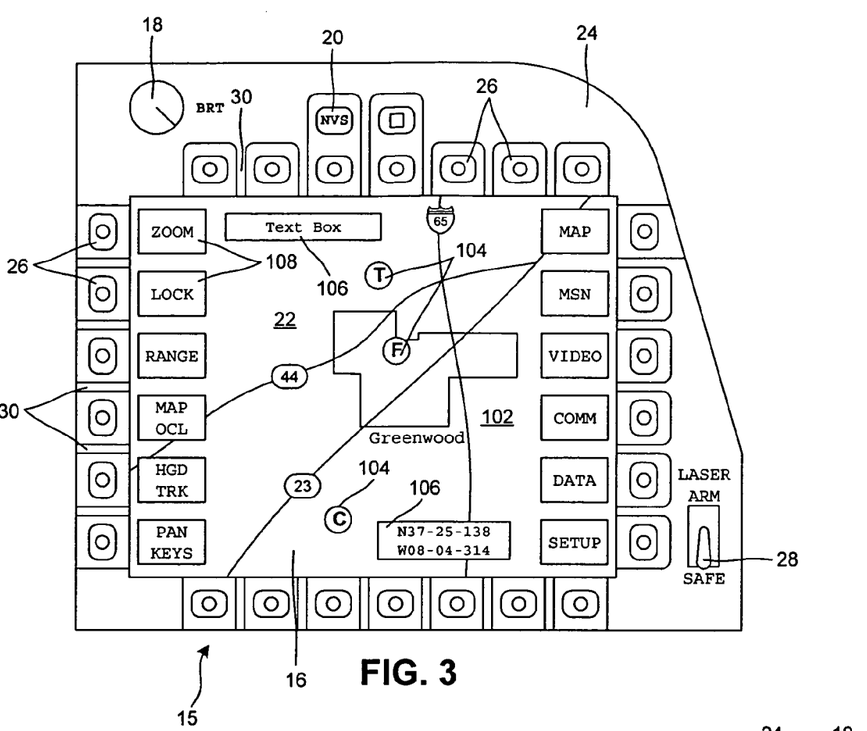
FIG. 3 is a front view of the programmable cockpit upgrade system module while displaying a moving map.

Referring to FIGS. 2B and 3, the programmable cockpit upgrade system 14 can include one or more modules 15. For example, the programmable cockpit upgrade system 14 can be a modular assembly 17 with several integrated human-machine interfaces. FIG. 3 shows a front view of an example one of the modules 15. In the illustrated embodiment, each module 15 includes a color display 16 for presenting visual information to a pilot or other cockpit crew member of the aircraft 8. The display 16 can be, for example, a liquid crystal display (LCD) panel or an organic light emitting diode (OLED) device. Other types of displays can include a cathode ray tube (CRT) display or a plasma display. To improve visibility of the display in bright light (e.g., a sunlit environment), at night (e.g., when using night vision goggles) and/or through chemical and biological hazard protective gear (e.g., mission oriented protective posture, or MOPP, gear), the viewing surface of the display 16 can include various coatings and/or laminations. Brightness of the display 16 can be controlled with an input device, such as a knob 18. Illumination output can be switched between a daylight mode and a night vision mode with an input device, such as a dedicated push button 20. In one embodiment, the display 16 includes a pressure sensitive surface 22 (or "touch screen"), which functions as a user input to the programmable cockpit upgrade system 14. The pressure sensitive surface 22 can be placed in multiple keypad arrangements depending on a currently used mode of operation of the programmable cockpit upgrade system 14.

The display 16 can be retained in a frame 24. The frame 24 can be made from plastic or other suitable material. The frame 24 can include a plurality of push buttons 26 adjacent the display 16 that serve as user input keys. One or more of the buttons 26 can be associated with a predetermined function of the programmable cockpit upgrade system 14 and can be marked with an icon or text corresponding to the predetermined function. Alternatively, and as illustrated, the buttons 26 are used to select or specify an item or function displayed on a corresponding section of the display 16. Buttons 26 used in conjunction with the display 16 in this manner are often referred to in the art as "bezel" buttons.

Various other user input devices can be provided on the module 15 and/or as part of the programmable cockpit upgrade system 14 as a whole. These devices can take the form of push buttons, dials, switches and the like. In the illustrated example, the programmable cockpit upgrade system 14 includes a laser arming switch 28.

Figure 4:
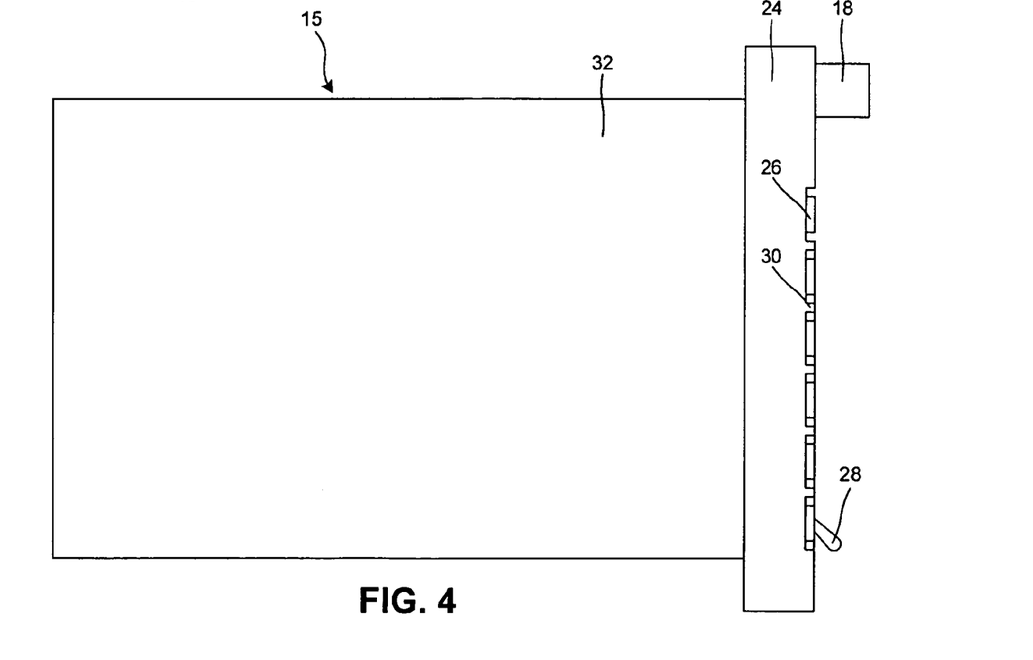
FIG. 4 is a left side view of the programmable cockpit upgrade system module.
Figure 5:
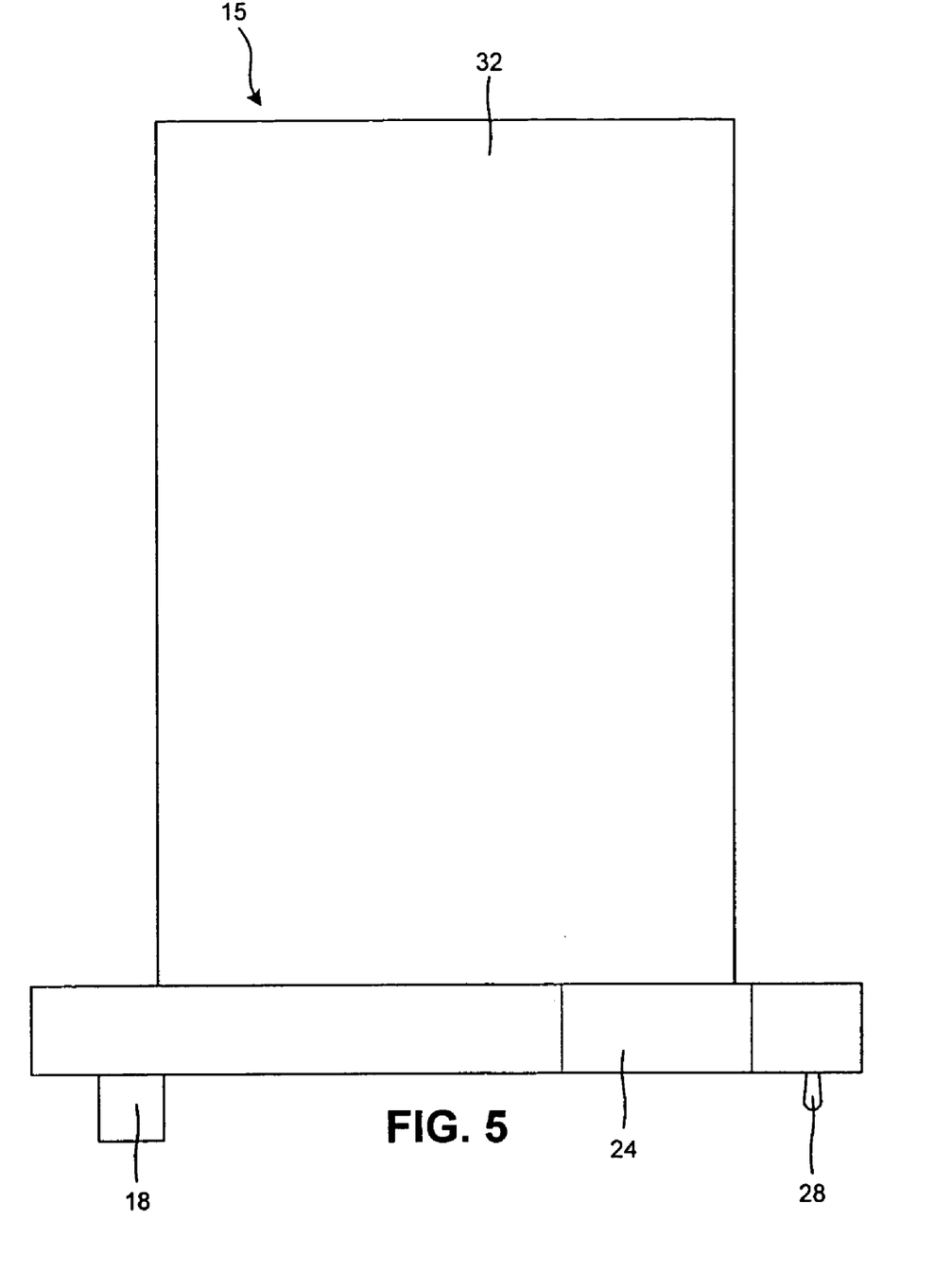
FIG. 5 is a top view of the programmable cockpit upgrade system module.

With additional reference to FIGS. 4 and 5, respectively shown are a side view and a top view of the module 15 shown by example in FIG. 3. The frame can include raised portions 30 between each button 26 to provide the user a tactile indicator that can be helpful in finding a particular button 26 of interest, particularly when the user's visual attention is directed elsewhere.

A mounting plate (not shown), clips, detents, fastener openings, brackets or the like can be included to assist in securing the programmable cockpit upgrade system 14 as a module assembly 17 (or individual modules 15) to be part of the cockpit instrument panel 12b (FIG. 2B). Alternative, the programmable cockpit upgrade system 14 can be configured to completely replace an entire existing instrument panel 12a (FIG. 2A). The programmable cockpit upgrade system 14 can be physically arranged to mount to a standardized or non-standardized receiving location in the cockpit depending on the type of aircraft 8 and the location in the cockpit into which the programmable cockpit upgrade system 14 is to be placed.

For instance, the programmable cockpit upgrade system 14 can be secured to a standard DZUS mounting rail assembly. In the illustrated embodiment, the programmable cockpit upgrade system 14 is received, at least in part, in a location formerly occupied by an analog sensor display. As one of ordinary skill in the art will appreciate, the illustrated location of the programmable cockpit upgrade system 14 on the instrument panel 12 is merely exemplary.

The programmable cockpit upgrade system 14 and/or each module 15 includes a main housing 32 located behind the frame 24. The frame 24 can be connected to the main housing 32 or integrally formed therewith. In one embodiment, the main housing 32 is made of metal, although other suitable materials could be used. The main housing 32 is adapted to fit into the cockpit instrument panel 12 and the frame 24, which can be wider and taller than the main housing 32, can have a back surface that contacts an instrument panel housing or facade when the programmable cockpit upgrade system 14 is installed. The main housing 32 can include a plurality of heat radiating fins (not shown) that are arranged to function as a heat sink for internal components of the programmable cockpit upgrade system 14. Although not illustrated, the main housing 32 also can have openings to ventilate an interior of the programmable cockpit upgrade system 14. A cooling fan or fans (not illustrated) can be mounted over the openings to enhance air flow through the programmable cockpit upgrade system 14.

Figure 6:
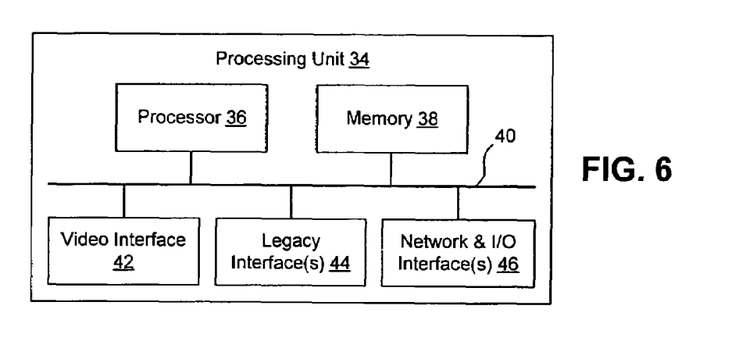
FIG. 6 is a schematic block diagram of a processing unit for the programmable cockpit upgrade system.

With additional reference to FIG. 6, shown is a schematic block diagram of a processing unit 34. The programmable cockpit upgrade system 14 can include one or more processing units 34 to carry out the desired functionality of the programmable cockpit upgrade system 14. Each processing unit 34 is generally implemented as a single board computer. For example, a signal board computer can be comprised of a printed circuit board having the operative components of the processing unit 34 mounted on the board or retained by sockets that are mounted to the board.

The processing unit 34 can include a processor 36 (or processors), a memory 38 (or memories), a local interface 40, a video interface 42, an interface 44 (or interfaces) to connect to legacy devices within the aircraft 8 such as an avionics bus, a weapons bus and/or an electronic warfare bus, and an interface 46 (or interfaces) to connect to additional input devices and/or communicate with a network or networks. Also present can be support circuitry and power supplies for these components.

The processor 36 is used to execute logical instructions, such as in the form of computer code (e.g., software applications). In one embodiment, the processor 36 is a PENTIUM III general purpose microprocessor available from Intel Corporation, but other general purpose processors can be used. In particular, processors designed for mobile applications (e.g., laptop computers) that have reduced heat output and power usage compared to "standard" processors of comparable capability can be used for the processor 36.

The memory 38 is used to store data, software, logic routine instructions, computer programs, files, operating system instructions, and the like. Accordingly, the memory 38 can include several devices and can comprise volatile and non-volatile memory components. Volatile memory components typically do not retain data values upon a loss of power. Non-volatile memory components retain data upon a loss of power. Thus, the memory 38 can include, for example, random access memory (RAM), read only memory (ROM), hard disks, floppy disks, optical disks (including, but not limited to, CDs and DVDs), tapes, and/or other memory components, plus associated drives and players for these memory types.

Software used to carry out the functions described herein can be broken-up so that different parts can be selectively executed by the processor 36 or, if present, among multiple processors 36.

The processor 36 and the memory 38 are coupled using the local interface 40. The local interface 40 can be implemented with a data bus with an accompanying control bus or a network, for example.

The processing unit 34 can have a video interface 42 for driving the display 16. In some arrangements, not every processing unit 34 of the programmable cockpit upgrade system 14 may have a video interface 42. The video interface 42 can be, for example, a video card that operatively connects the display 16 to the local interface 40, such as a VGA video output or IEEE 1394B Firewire. In one embodiment, the display 16 can be driven to display full motion video images.

As indicated, the processing unit 34 can include one or more legacy interfaces 44 for operatively connecting to existing devices and systems of the aircraft 8. The interface(s) 46 can be used to connect and establish communication with additional devices and systems. The additional devices and systems can be legacy devices and systems of the aircraft 8 that did not previously interface with the replaced cockpit instrument panel item(s) and/or systems that are new to the aircraft 8 (e.g., added contemporaneously with or after the programmable cockpit upgrade system 14). The interfaces(s) 46 can be used to establish a temporary connection with a device. For example, a USB flash memory device can be temporarily connected to the interface 46 to exchange data or files with the processing unit 34, such as preflight mission planning data. In other arrangements, the interface 46 can be used to connect a user input device to the programmable cockpit upgrade system, such as a mouse, a keyboard, a joystick, a light pen, 3D or "stereo" glasses and associated controller, etc. The interface 46 also can be used to connect an output device to the programmable cockpit upgrade system, such as audio speakers, a printer and so forth.

In yet other arrangements, the interface 46 can establish communication with a network or networks to allow the programmable cockpit upgrade system 14 to send and receive data signals, voice signals, video signals and the like via the network(s). In particular, the interface 46 can operatively couple the processing unit 34 to a network, such as an Ethernet 100baseT or IEEE 1394 Firewire network, that is configured to allow multiple processing units 34 of the programmable cockpit upgrade system 14 to communicate. In one embodiment, the network can be extended outside of the programmable cockpit upgrade system 14 to allow the processing unit(s) 34 to communication with other systems present in the aircraft 8. The interface 46 also may be used to connect the processing unit 34 to a transceiver 43 (e.g., radio subsystem or series of radio subsystems) for establishing two way digital and/or analog data exchange with other aircraft, land based facilities and/or water based facilities. Accordingly, the interface 46 can be any combination of input/output ports with associated support circuitry, network cards, modems, etc.

Among the legacy interfaces 44 and the interfaces 46, the processing unit 34 can include one or more multiplex databus interfaces (e.g., a MIL-STD-1553 interface) common to many military aircraft, one or more unidirectional data bus interfaces (e.g., an ARINC-429 interface) common to many commercial aircraft, an Ethernet interface (e.g., ARINC-654), a serial interface (e.g., RS-232, RS422 and/or RS-485), and a universal serial bus (USB) interface. Of course, the processing unit 34 can have other standard and proprietary interfaces, such as, without limitation, a 100baseT Ethernet interface, 1394B Firewire, Bluetooth, 802.11b, 802.11g, and so forth. A video capture module can be added to capture video data (e.g., from a camera mounted on the aircraft 8 or a store launchable from the aircraft 8). The captured video can be displayed on the display 16 and/or stored for future reference, such as by saving a video file on the memory 38.

Figure 7:
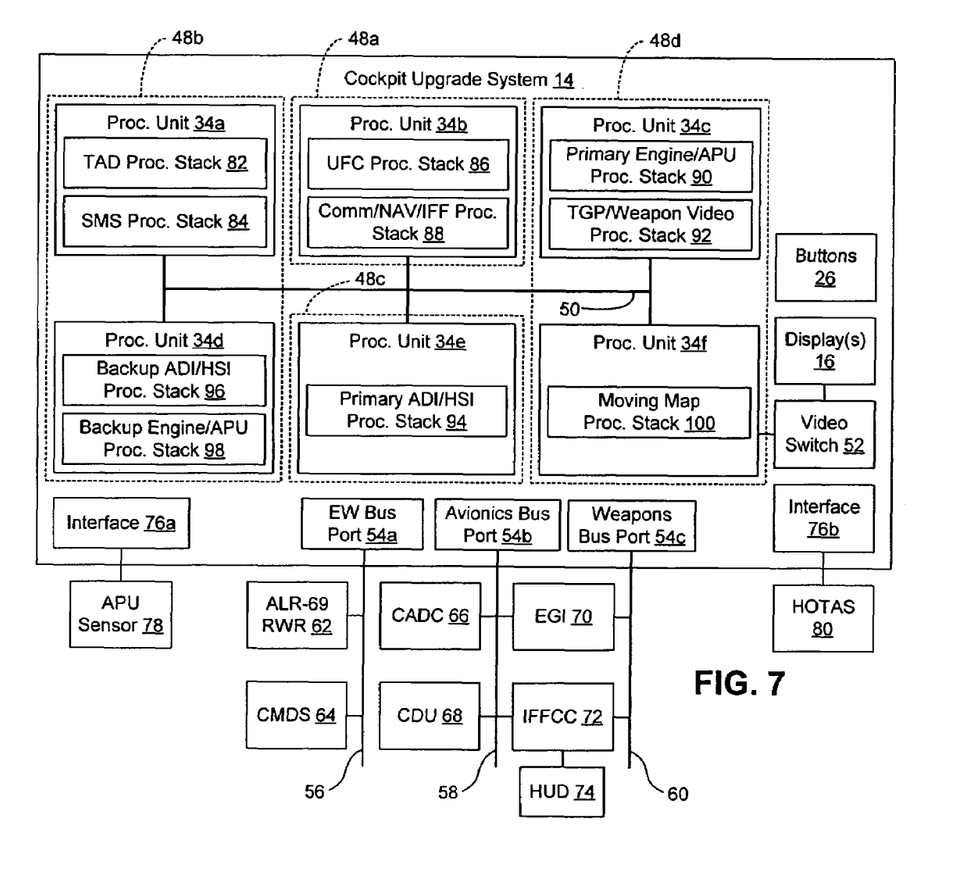
FIG. 7 is a schematic block diagram of the programmable cockpit upgrade system.

With additional reference to FIG. 7, a block diagram depicting the system architecture of the programmable cockpit upgrade system 14 is illustrated. In the illustrated example, the programmable cockpit upgrade system 14 includes six processing units 34a through 34f. It will be appreciated that the programmable cockpit upgrade system 14 can include less than or more than six processing units 14 depending on criteria such as a desired level of functionality to be performed by the programmable cockpit upgrade system 14, an amount of space in the housing(s) 32 (FIG. 4) to accommodate the processing units 14 and a desired level of redundant processing performed by the programmable cockpit upgrade system 14.

The processing units 34 can be placed in cavities defined by individual module 15 housings 32 or in divided cavities of a housing for the overall programmable cockpit upgrade system 14. Such an arrangement establishes physical isolation of processing units 34 and/or assists in mounting the processing units 34 in a manner to avoid excessive movement of the processing units 34 during flight. For example, one of the processing units 34b can be located in a first cavity 48a, two of the processing units 34a and 34d can be located in a second cavity 48b, one of the processing units 34e can be located in a third cavity 48c and the remaining two processing units 34c and 34f can be located in a fourth cavity 48d. In FIG. 7, the cavities are symbolically represented by dashed lines.

In connection with a logical and/or physical arrangement of the processing units 34 and/or displays 16, the modular assembly 17 (FIG. 2B) that physically embodies the programmable cockpit upgrade system 14 can be organized, for example, into a left multifunction display module 15a, a center multifunction display module 15b and a right multifunction display module 15c.

The processing units 34 can be arranged in a networked configuration so that each of the processing units 34 can exchange data (e.g., in the form of network data packets or messages) with each of the other processing units 34. In addition, the processing units 34 can be operatively networked to download data (e.g., retrieve a file) from the memory 38 of one processing unit 34 by another processing unit 34, upload data (e.g., store a file) from one processing unit 34 to the memory 38 of another processing unit 34, distribute processing load among the processors 36 of the processing units 34 and perform other file sharing and network functions.

The processing units 34 can be networked together using a network backbone 50. In one embodiment, the network backbone 50 is an Ethernet topology implemented with, for example, 100baseT. As another example, the network backbone 50 can be implemented with IEEE 1394B Firewire. The network backbone 50 can be fully contained within the programmable cockpit upgrade system 14. If desired, the network backbone 50 can be extended out of the programmable cockpit upgrade system 14 so that additional systems and/or devices of the aircraft 8 can be networked with the processing units 34 of the programmable cockpit upgrade system 14.

Each display 16 can be operatively connected to display video images from any of the processing units 34. Alternatively, each display 16 can be operatively connected to display video images from selected processing units 34. For example, the displays 16 can be connected to the video interface 42 of each processing unit 34 through a video switch 52. The switch 52 delivers a selected one of the video streams to each display 16. The switch 52 can be controlled by user input and/or by software that determines the video data that should be displayed on each display 16 (e.g., as based on the functions of the programmable cockpit upgrade system 14 used at that moment). In an alternative arrangement, one of the processing units 34 is used to drive a particular display 16 with a video signal generated by that processing unit 34 or a video signal from one of the other processing units 34 that is transmitted to the driving processing unit 34 over the network backbone 50.

The buttons 26, switches 28, touch screen surface 22 any another other user input devices can be operatively connected to control the processing units 34. For example, a switching hub, multiplexer and/or encoder (not shown) can be used to direct user input signals generated by the user input devices (e.g., the surfaces 22 and the bezel buttons 26) to the processing unit 34 associated with a function of the programmable cockpit upgrade system 14 used at that moment.

To operatively connect the programmable cockpit upgrade system 14 to other systems of the aircraft 8, the programmable cockpit upgrade system 14 can include, for example, ports 54 for establishing a physical and/or operative connection to those systems. In the illustrated example, the programmable cockpit upgrade system 14 connects to other systems over an existing bus architecture of the aircraft 8. For example, an electronic warfare bus port 54a can establish connectivity to an electronic warfare bus 56, an avionics bus port 54b can establish connectivity to an avionics bus 58 and a weapons bus port 54c can establish connectivity to a weapons bus 60. Each of the electronic warfare bus 56, the avionics bus 58 and the weapons bus 60 can be implemented as a MIL-STD-1553 interface, for example.

Although not shown, the ports 54 can extend the respective buses to selected ones or all of the processing units 34 so that signals present on the buses 56, 58, 60 can be individually acquired by the processing units 34. In another arrangement, the ports 54 can connect the buses 56, 58, 60 to one of the processing units 34 for data acquisition and data sharing among the processing units 34. For example, the acquired data can be shared with the other processing units 34 over the network backbone 50 and data from the other processing units 34 to be placed on the buses can be sent to the processing unit 34 connected to the ports 54 for transmission over the appropriate bus 56, 58, 60.

Example aircraft 8 systems connected to the programmable cockpit upgrade system 14 over the electronic warfare bus 56 include a threat warning unit 62 such as an ALR-69 radar warning receiver (RWR) and a countermeasures dispensing system (CMDS) 64. Example aircraft 8 systems connected to the programmable cockpit upgrade system 14 over the avionics bus 58 include an air data unit 66 such as a central air data computer (CADC) and a navigation display system 68 such as a control display unit (CDU). Example aircraft 8 systems connected to the programmable cockpit upgrade system 14 over the weapons bus 60 include a weaponry navigation system 70 such as an embedded global positioning/inertial navigation system (EGI) and a weapons release system 72 such as an integrated flight and fire control computer (IFFCC). In one embodiment, the weaponry navigation system 70 and the weapons release system 72 can have connection to the avionics bus 58 as well as the weapons bus 60. The weapons release system 72 can be connected to a heads-up display (HUD) 74 that projects an image onto the canopy or windshield (not shown) of the aircraft 8.

The programmable cockpit upgrade system 14 can include any additional interfaces 76 that may be appropriate. For example, an interface 76a can be used to establish connectivity of one or more processing units 34 to an auxiliary power unit (APU) sensor(s) 78 that generates analog signals relating to APU status. As another example, an interface 76b can be used to establish connectivity of one or more processing units 34 to a cockpit input device 80, such as a hands-on throttle and stick (HOTAS).

Many of the signals received over the ports 54 and/or interfaces 76 may be in analog form. Accordingly, the processing units 34 can include analog to digital converters (ADCs) to convert received analog signals to digital signals and/or values for processing. Similarly, to generate output signals in an expected form, the processing units 34 may include digital to analog converters (DACs) to produce analog output signals. The processing units 34 may also include video frame grabbers, discrete inputs and/or outputs and other interfaces as may be appropriate for the functionality carried out by the individual processing units 34.

Each processing unit 34 is responsible for executing logic instructions to carry out functionality associated with one or more processing stacks. Example processing stacks are illustrated for each processing unit 34, but it will be appreciated that additional or alternative processing stacks can be included so that the programmable cockpit upgrade system 14 can carry out other functionality.

The first processing unit 34a can execute a tactical awareness display (TAD) processing stack 82 and a stores management system (SMS) processing stack 84. The TAD processing stack 82 can be used to generate visual battlefield representations, sometimes referred to as situational awareness displays. The displayed representations include icons used to represent enemy, neutral and friendly party positions, target positions and other landmarks on a background having concentric circles indicating relative distance from the aircraft. Information for display generation can be received over a radio link, such as by a situational awareness data link (SADL) commonly used by F-16 and A-10 aircraft. The SMS processing stack 84 can be used to general a visual representation of available arms and interface with the user to control those arms (e.g., via touch screen and/or bezel buttons input). Accordingly, the SMS processing stack 84 can provide an arms control panel (ACP) or digital stores management system (DSMS) interface to the cockpit crew. Among the input signals used by the first processing unit 34a to carry out these functions are signals from the threat warning unit 62 (e.g., ALR-69 RWR) and video data from a fast tactical imagery/unmanned aerial vehicle (FTI/UAV) system.

The second processing unit 34b can execute an upfront controller (UPC) processing stack 86 and a communications ("Comm"), navigations (NAV), and identify friend or foe (IFF) processing stack 88. The UPC processing stack 86 implements an interactive pilot task assistance function. This function can assist the cockpit crew in managing aircraft systems and operations by providing a centralized and menu driven control interface to various systems of the aircraft. As should be understood, many cockpits have buttons and switches located to the left of the pilot, to the right of the pilot and sometimes over the pilot. The functions performed by these buttons and switches can be carried out by the programmable cockpit upgrade system 14 by including logic in the UPC processing stack 86 that simulates these buttons and switches in the programmable cockpit upgrade system 14 (e.g., by using the bezel buttons, touch screen, displayed menus and/or a displayed graphical user interface). The communications, navigations, and identify friend or foe (IFF)

processing stack 88 can also implement an interactive interface to various aircraft systems. For instance, the stack 88 can assist the cockpit crew in managing and using communications devices that exchange voice and/or data information with other aircraft and/or land or sea based facilities; controlling and using navigational tools and systems, e.g., the CDU 68; and controlling and using an on-board IFF system.

The third processing unit 34c can execute a primary engine and auxiliary power unit (APU) processing stack 90 and a tracking pod (TGP) and weapons video processing stack 92. The primary engine and APU processing stack 90 can generate displays regarding engine performance and APU performance. Such information is conventionally displayed using analog gauges. Using the stack 90, the programmable cockpit upgrade system 14 can be used to display simulated analog gauges and/or any other graphical representations of engine and APU status. Icons, colors and menus can be added to the displayed data to modernize the displayed information in the style of personal computing type symbology. A menu driven control system can be executed to assist in controlling certain engine and APU properties. The TGP and weapon video processing stack can be used to view video data transmitted back to the aircraft by launched stores and/or control launched stores using a displayed user interface.

Skipping to the fifth processing unit 34e, the fifth processing unit 34e can execute a primary attitude direction indicator (ADI) and horizontal situation indicator (HSI) processing stack 94. The ADI/HSI processing stack 94 can generate displays of avionics information. Such information is conventionally displayed using analog gauges. Using the stack 94, the programmable cockpit upgrade system 14 can be used to display simulated analog gauges and/or any other graphical representations of avionics information. Icons, colors and menus can be added to the displayed data to modernize the displayed information in the style of personal computing type symbology. Among the input signals used by the fifth processing unit 34e to carry out these functions are signals from an inertial navigation system (EGI NAV).

The fourth processing unit 34d can execute a backup ADI/HSI processing stack 96 and a backup engine and APU processing stack 98. These backup stacks 96, 98 can "take over" for the corresponding primary ADI/HSI processing stack 94 executed by the fifth processing unit 34e and/or the primary engine/APU processing stack 90 executed by the third processing unit 34c in the event of a failure of either of those processing units 34 or stacks. The backup stacks 96, 98 can be executed concurrently with the primary stacks 90, 94 (e.g., in a redundant operating configuration) to speed transition to the backup stacks 96, 98 in the event that the primary stacks 90, 94 become unavailable.

The sixth processing unit 34f can execute a moving map processing stack 100. FIG. 3 shows a display 16 of the a module 15 while displaying a moving map 102 with a network connection to a command and control center. While this is the only illustrated displayed imagery for the programmable cockpit upgrade system 14, it will be appreciated that the other processing stacks 86 through 98 can generate video images for display on the display 16. The video images can be dynamically updated to stay current with aircraft 8 and mission progress. The video images can include data, icons, colors, menus, graphical user interfaces and so forth to make cockpit crew member decision making easier by incorporating intuitive user interactive features. In this manner, the cockpit is modernized using personal computer style symbology, menus, interfaces and so forth. The images produced by multiple processing stacks 86 through 100 can be displayed simultaneously and/or one at a time. The displayed video stream can be selected and/or toggled by use of the bezel buttons and/or touch screen. Software can be used to automatically display the video output of one of the processing stacks based on the detection of a particular situation or point in a mission.

The moving map 102 can be any representation of a battlefield or area over which the aircraft 8 is flown. The map 102 can include a topographic features, man-made structures (e.g., buildings and/or roads), and so forth. Overlaid on the map 102 can be reference indicators 104 (such as symbols, icons, circled letters, etc.) to display the aircraft's position relative to the map, target location(s), friendly forces location (s), neutral party location(s), enemy forces location(s), threat location(s), and so forth. As such, the map 102 can simultaneously provide the cockpit crew with a mapping function and with situational awareness information.

The moving map protocol stack 100 can "move" or "scroll" the map 102 relative to the display 16 as the aircraft 8 moves. In this manner, the map 102 is kept current relative to the aircraft's location. Zoom features can be used to change the relative size of map features. As will be appreciated, the map 102 does not physically move, but the logic executed by the processing unit 34f causes the displayed portion of the map 102 to update with aircraft movement. The logic updates the displayed map 102 based on aircraft location information and speed and heading information received from devices external to the programmable cockpit upgrade system 14, such as the systems connected to the avionics bus 58. To assist in map 102 generation, the processing unit 34f can store and/or receive digital terrain elevation data (DTED), which can be actively correlated with GPS navigation data from the various avionics subsystems of the aircraft (e.g., the CADC 66 and/or the CDU 68).

Information can be overlaid with the map 102. For instance, a text box or boxes 106 can be placed over the map 102 to provide the user with messages, system information, mission information, location and heading information and the like. User interactive blocks 108 can be shown on the display 16. The user interactive blocks 108 can be used to guide user input and can be associated with functionality specific to the current images displayed by the programmable cockpit upgrade system 14 and as generated by one or more of the processing units 34. For example, when the touch sensitive surface 22 is pressed in the location of a particular user interactive block 108, an associated function can be carried out. Alternatively, the blocks 108 can be used to indicate functionality associated with a corresponding bezel button 26.

The programmable cockpit upgrade system 14 can have a network connection to a command and control facility over which data is exchanged to provide the aircraft 8 with "netted warfare" capability. The data can include, for example, tactical and/or intelligence data received across a tactical digital information link (TADIL), such as the TADILJ or TADILK satellite communication standards used by the military. The data can be broadcast by the command and control facility as it is received from sources of information. Therefore, the data received by the aircraft 8 can be based on information acquired during flight and/or during execution of the aircraft's mission. The information transmitted to the aircraft 8 can relate to various aspects of the mission, including weather notices, friendly, enemy and neutral party positions, threat information, target information and so forth. The exchange of data can be bidirectional and include audio signals as well as coded and uncoded data packets (e.g., alphanumeric messages).

The tactical and/or intelligence data can be displayed to the user on the screen in the form of text messages or in the form of graphical representations, but without being overlaid on a map (e.g., as commonly displayed in conjunction with a situational awareness data link (SADL) tactical awareness display (TAD). When combined with the map 102, the tactical and/or intelligence data is preferably overlaid onto the map 102 and displayed as text, graphics and/or icons. Accordingly, the tactical and/or intelligence information can be seamlessly integrated with the map 102 such that the map 102 is updated as the information is received. Previously, TADIL messages were available only verbally through an ARC-210 radio and those messages were hand copied for comprehension and action. With the programmable cockpit upgrade system 14, the TADIL information can be transmitted to the aircraft 8 in a data network arrangement such that the data is, for example, uploaded to the programmable cockpit upgrade system 14 and visually presented to the cockpit crew. The programmable cockpit upgrade system 14 also can be used to generate audio alerts in response to specified tactical and/or intelligence data messages. As will be appreciated, the TADIL info can be used apart from moving map mode, such as by itself or in conjunction with other operational modes and processing stacks of the programmable cockpit upgrade system 14.

Additional processing stacks that have not been illustrated can be executed and/or illustrated processing stacks can carryout functions that have not been described in detail. For instance, the programmable cockpit upgrade system 14 can be used to display route overlays and/or mission plan diagrams in conjunction with a stationary or moving map. The navigation and/or mission data used to generate the navigation mode displays can be updated during flight by the crew (e.g., by using the touch screen and/or bezel buttons) and/or a command and control center. For instance, navigational waypoints can be added, edited or deleted by the crew or remotely by command and control personnel to update the aircraft's flight plan. The programmable cockpit upgrade system 14 can be programmed to update the display in accordance with such in-flight rerouting information and/or alert the pilot to such changes. In one embodiment, a waypoint (or set of waypoints) can be added by a touch screen operation (e.g., by touching a desired location on a displayed map with a finger or stylus that corresponds to the new waypoint). To assist in these functions or to generate a entirely new mission plan on-board the aircraft, the programmable cockpit upgrade system 14 can execute a mission planning software application. As will be understood, mission planning is conventionally not performed using cockpit instrument panel devices and rerouting has conventionally been carried out by entering coordinates with alphanumeric keys.

In addition to in-flight navigational displays, the programmable cockpit upgrade system 14 can be used to displayed approach and departure plates. The approach and departure plates can be updated based on user entered and/or received rerouting information. The approach and departure plates can be coordinated using a joint precision approach and landing system (JPALS). Therefore, the programmable cockpit upgrade system 14 can function as a JPALS approach processing and display system (sometimes referred to as a JPALS terminal). Furthermore, the programmable cockpit upgrade system 14 can function as a communications navigation surveillance/air traffic management (CNS/ATM) gateway (e.g., processing and display system) to further coordinate navigation and mission objectives.

As another example, the programmable cockpit upgrade system 14 can include a checklist mode. Aircraft operation involves following a number of checklists, including pre-flight, in-flight and post-flight checklists. Conventionally, these lists are embodied in paper form. The programmable cockpit upgrade system 14 can be programmed to step the aircraft crew through checklists displayed on the display 16. An item can be marked as "checked" by touching a corresponding location on the display 16.

Another example function is an emergency procedures function. During unusual or emergency handling of the aircraft, the programmable cockpit upgrade system 14 can be used to provide the crew with a routine to follow. Hierarchical menus can be used to guide the crew to a potentially useful course of action and/or to assist in diagnosing the cause of the problem and suggesting potential corrective action.

As will be appreciated, each processing unit 34 can execute a BIOS, an operating system and/or software modules that implement the various features and functions of the foregoing modes of operation and any other modes of operation as are desired. The software can be installed, managed, upgraded or changed much in the same manner that software is managed on a personal computer. Accordingly, the programmable cockpit upgrade system 14 represents a computing and display device that can be installed in an aircraft cockpit instrument panel.

As indicated, the programmable cockpit upgrade system 14 is implemented to physically connect to existing wires, wiring harnesses and/or sockets of the aircraft as well as provide an operative interface for legacy devices and systems of the aircraft 8 to the user. In this manner, the programmable cockpit upgrade system 14 can be integrated into the aircraft 8 in a non-intrusive manner. For instance, upgrading, reprogramming or replacement of devices outside the cockpit instrument panel may not need to be carried out, yet the programmable cockpit upgrade system 14 can carry out the functions previously performed by any replaced cockpit instrument panel devices. In particular, an existing main mission computer of the aircraft that executes an operational flight program (OFP) and that is conventionally located outside the cockpit instrument panel need not be altered or removed for most embodiments of the programmable cockpit upgrade system 14. Rather, the programmable cockpit upgrade system 14 is added as a functional "layer" over the mission computing layer existing within the aircraft 8. The programmable cockpit upgrade system 14 can execute logic to communicate with the legacy devices and systems without change or upgrade to those devices and systems. Therefore, the replacement of cockpit instrument panel devices with the programmable cockpit upgrade system 14 is transparent to the legacy devices and systems (e.g., the programmable cockpit upgrade system 14 "appears" to the legacy devices and systems just as the replaced cockpit instrument panel devices appeared).

As will be appreciated, the system 14 can be installed in the field without requiring major overhaul of the aircraft 8 (e.g., changes outside the cockpit instrument panel). In addition, the system can provide the same legacy functionality as any replaced items, plus new functionality in a non-intrusive manner by reading data from the aircraft avionics bus and/or other busses without making changes to an existing Operational Flight Program (OFP) software executed by computing devices outside of the instrument panel. In one embodiment, the system 14 is arranged in a client-server architecture for receiving and transmitting data to and/or from other military systems using a networking protocol, such as TCP/IP or a Department of Defense XML message structure.

In one embodiment, mission information can be transferred to the programmable cockpit upgrade system 14 by connecting a memory device (e.g., a USB flash drive "memory stick") at the beginning of the mission. In another embodiment, displayed information, layouts, button functions, touch screen functions can be customized by to individual cockpit crew member preferences, including, for example, left or right handiness of the user.

Although particular embodiments of the invention have been described in detail, it is understood that the invention is not limited correspondingly in scope, but includes all changes, modifications and equivalents coming within the spirit and terms of the claims appended hereto.

What is claimed is:

1. A programmable computing and display device for upgrading a cockpit instrument panel of an aircraft, comprising:
a plurality of processing units, wherein:
each processing unit includes a processor for executing one or more protocol stacks and a memory that stores the one or more protocol stacks, each protocol stack being logical instructions that embody control functionality of a control program for a system of the aircraft or operational functionality of an interactive, military-related program;
each processing unit includes a local interface that operatively couples the processor and the memory of the processing unit; and
each processing unit includes a network interface;
a network backbone operatively coupled to the network interface of each processing unit so as to establish a network among the processing units for the exchange of network data traffic;
at least one display to display video graphics resulting from the execution of one of the protocol stacks by a corresponding one of the processing units to a cockpit crew member; and
a modular assembly that retains the processing units, the network backbone and the display such that the network of processing units is contained inside the modular assembly.

2. The programmable computing and display device according to claim 1, wherein the modular assembly is physically configured to replace at least one legacy device mounted in the cockpit instrument panel of the aircraft.

3. The programmable computing and display device according to claim 1, wherein the network backbone is Ethernet.

4. The programmable computing and display device according to claim 1, wherein the network backbone is selected from 100 baseT Ethernet or IEEE 1394 Firewire.

5. The programmable computing and display device according to claim 1, wherein the network is extended outside the programmable computing and display device to add an assembly located on-board the aircraft to the network.

6. The programmable computing and display device according to claim 1, wherein the programmable computing and display device is a form-fit-function replacement for at least one legacy cockpit instrument panel device such that the programmable computing and display device connects to aircraft wiring dedicated to at least one legacy device of the cockpit instrument panel.

7. The programmable computing and display device according to claim 6, wherein the programmable computing and display device executes logic to carry out functions performed by the legacy device.

8. The programmable computing and display device according to claim 6, wherein the legacy device includes an analog sensor display.

9. The programmable computing and display device according to claim 1, further comprising an interface to a radio subsystem.

10. The programmable computing and display device according to claim 9, wherein the radio subsystem establishes communications with a command and control facility.

11. The programmable computing and display device according to claim 9, wherein the programmable computing and display device executes logic to display a map that is updated relative to movement of the aircraft and to display an overlay with tactical military information received from the radio subsystem, the overlay displayed in conjunction with the map.

12. The programmable computing and display device according to claim 11, wherein the overlay is updated with the map relative to movement of the aircraft.

13. The programmable computing and display device according to claim 11, wherein the overlay is generated without cockpit crew interaction with the aircraft computing and display device.

14. The programmable computing and display device according to claim 1, further comprising a legacy interface for operatively connecting to aircraft wiring dedicated to a legacy cockpit instrument panel device and an interface for establishing a connection to at least one of a series of radio subsystems.

15. The programmable computing and display device according to claim 1, further comprising a video capture interface.

16. The programmable computing and display device according to claim 1, wherein among the processing units, the programmable computing and display device executes logic to carry out at least one of an upfront controller, a digital stores management system, or a flight and engine instrumentation human-machine interface.

17. The programmable computing and display device according to claim 1, wherein the programmable computing and display device is field installable without requiring changes to the aircraft outside the cockpit instrument panel.

18. The programmable computing and display device according to claim 1, the programmable computing and display device provides legacy functionality for a legacy device replaced by the programmable computing and display device and provides new functionality in a non-intrusive manner to the aircraft by reading data from a legacy bus.

19. The programmable computing and display device according to claim 18, wherein the programmable computing and display device is installable in the aircraft and operation without making changes to an existing Operational Flight Program (OFP) software of the aircraft.

20. The programmable computing and display device according to claim 1, wherein the programmable computing and display device is installable in the aircraft and operation without making changes to an existing Operational Flight Program (OFP) software of the aircraft.

21. The programmable computing and display device according to claim 1, wherein the programmable computing and display device is arranged in a client-server architecture with another system.

22. In combination, an aircraft having a cockpit instrument panel with an opening corresponding to a removed legacy cockpit instrument panel device and a programmable computing and display device according to claim 1, wherein the programmable computing and display device is secured in the opening as a form-fit-function replacement to the legacy cockpit instrument panel device.

23. The programmable computing and display device according to claim 1, wherein the display is a touch screen display that forms an interactive human-machine interface by displaying video graphics and accepting user input with a pressure sensitive surface.

24. The programmable computing and display device according to claim 1, further comprising an external interface to at least one of an electronic warfare bus or a weapons bus.

* * * * *